Figure 5:
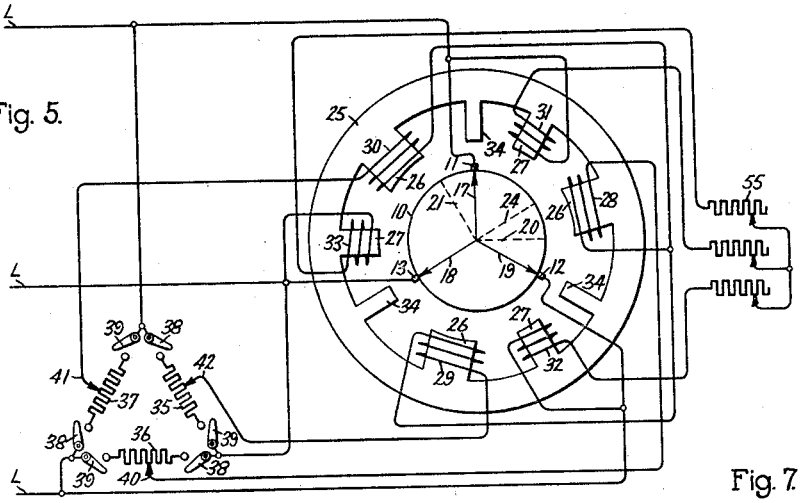

Nov. 7, 1933.  J. I. HULL  1,934,469
ALTERNATING CURRENT SELF EXCITED COMMUTATOR TYPE GENERATOR
Filed May 25, 1932  3 Sheets-Sheet 1
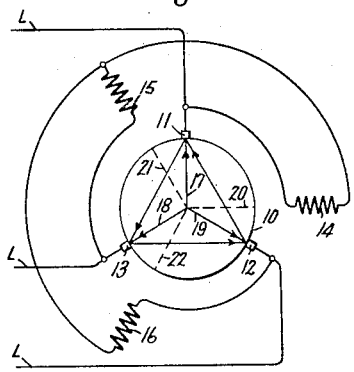
Fig. 1.
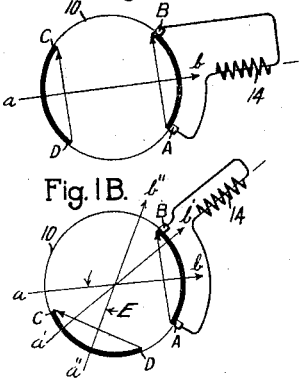
Fig. 1A.
Fig. 1B.
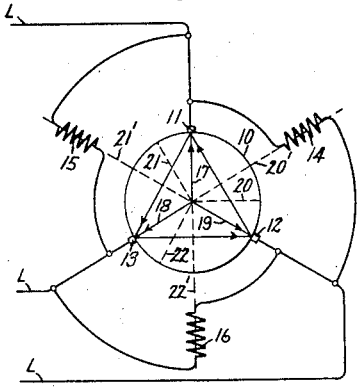
Fig. 1C.
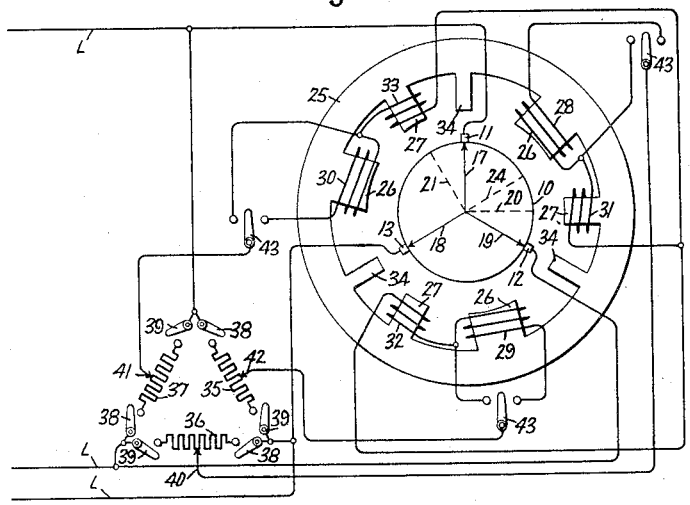
Fig. 2.
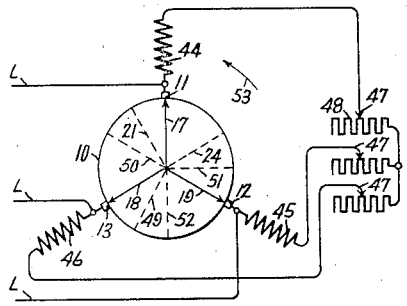
Fig. 3.
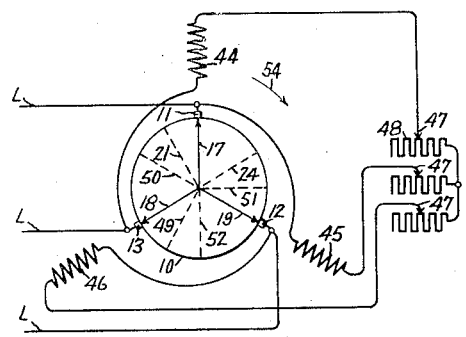
Fig. 4.
Inventor:
John I. Hull,
by *Charles V. Mullen*
His Attorney.

Nov. 7, 1933.  J. I. HULL  1,934,469
ALTERNATING CURRENT SELF EXCITED COMMUTATOR TYPE GENERATOR
Filed May 25, 1932   3 Sheets-Sheet 2

Inventor:
John I. Hull,
by Charles E. Mullen
His Attorney.

Nov. 7, 1933.  J. I. HULL  1,934,469
ALTERNATING CURRENT SELF EXCITED COMMUTATOR TYPE GENERATOR
Filed May 25, 1932  3 Sheets-Sheet 3

Inventor:
John I. Hull,
by Charles E. Tullar
His Attorney.

Patented Nov. 7, 1933

1,934,469

UNITED STATES PATENT OFFICE 1,934,469

ALTERNATING CURRENT SELF-EXCITED COMMUTATOR TYPE GENERATOR

John I. Hull, Swampscott, Mass., assignor to General Electric Company, a corporation of New York Application May 25, 1932. Serial No. 613,399

22 Claims. (Cl. 171—119)

My invention relates to self-exciting alternating current commutator type generators. The principal object of my invention is to provide a novel and simple method of controlling the phase sequence and frequency of the voltages generated by a self-exciting polyphase commutator type generator. An additional object of my invention is to provide novel and simple devices for practicing my method. A further object of my invention is to provide a method of and a simple device for simultaneously varying in accordance with predetermined laws the magnitude and frequency of the voltages generated by a self-exciting polyphase commutator type generator. A still further object of my invention is to provide a variable frequency self-exciting polyphase commutator type generator with which the above mentioned devices may be employed for the purposes stated, the generator being provided with a plurality of groups of exciting windings, each group consisting of at least two exciting windings having the same virtual magnetic axis, the exciting windings and the pole pieces surrounded thereby being so proportioned that the generator delivers a stable voltage at all frequencies, including zero frequency. A still further object of my invention is to provide a method of energizing the exciting windings of the above generator so that there will be no opposing components of exciting ampere turns in the exciting windings of each group.

For generating alternating current voltages within the normal commercial frequency range of 25 to 60 cycles, the standard alternating current polyphase synchronous generator is a very efficient, well understood, and satisfactory machine. There are, however, numerous applications of electric power in industry which can best be satisfied with alternating currents having a frequency below 25 cycles, some of these applications requiring a frequency as low as 2½ cycles, and even lower. The synchronous generator is ill suited for generating such low frequency voltages, because it must be driven at very low speeds and this results in a large, heavy, expensive generator and driving means therefor. The alternating current commutator type generator, however, is well suited for generating such low frequency voltages, because a low frequency design can be made with high speed and with independence of the number of poles, the difficulty of obtaining good commutation decreases as the frequency is lowered, and compensating and interpole windings can be employed to produce excellent commutation even with several hundred generated volts.

Some applications of electric power in industry not only require low frequency currents, but also require that both the frequency and the voltage be adjustable. In some of these variable frequency variable voltage applications it may be desirable to employ currents whose frequency and voltage can be varied independently of each other; but more often it is desired that the frequency and voltage vary simultaneously in accordance with some predetermined law which will give the best operating results for the particular application involved. A typical modern application requiring a source of simultaneously varying voltage and frequency is a group of synchronized alternating current motors which drive different machines, or which drive different sections of the same machine, as, for example a sectionalized printing press; the requirement in this case being that the different machines or the different sections of the same machine should be operated in synchronism at all speeds from maximum to zero with a locking torque between the motors at zero speed to prevent a change in the fixed relationship between the different machines, or between the different sections of the same machine, thus also preserving this fixed relationship when operation is resumed. To satisfy the requirements of this synchronized drive, it should be possible to vary in a sufficient number of steps the frequency of the source from some particular value to zero with a stable minimum voltage at zero frequency, this minimum voltage to have the most appropriate value for securing the best working results.

An additional and important modern application which can advantageously be operated by a source whose voltage and frequency vary simultaneously is an induction motor whose direction of rotation is frequently reversed. The reversing of the direction of rotation of an induction motor is often accomplished by "plugging." ("Plugging" is reversing a motor by sending current of reversed phase sequence through the motor while it is still coasting forward.) As compared to "plugging", the reversing of the direction of rotation of an induction motor can be attained in considerably less time with the same heat energy loss absorbed in its structure, or in the same time with considerably less heat energy loss absorbed in its structure, by simultaneously varying in suitable steps the frequency and voltage of the source connected to the motor, the frequency being varied from a particular value to zero and up to a particular value with reversed phase sequence, while the voltage may be thought of as consisting of two components, the magnitude of one component being constant and independent of the frequency, and the magnitude of the other component increasing with increased frequency, and vice versa.

United States Patent No. 1,127,290, Sherbius, February 2, 1915, discloses a self-exciting polyphase alternating commutator type generator whose frequency and voltage are independently adjustable. This generator has two main exciting windings for each phase and separate control means for each exciting winding. Although this generator is practicable for use in those applications which require independent control of voltage and frequency, it is not desirable for use in many applications which require a simultaneous variation of voltage and frequency in accordance with some predeterminable law, because the double control means greatly complicate the regulation of the exciting windings necessary to obtain this simultaneous variation of voltage and frequency, and because the double control means increase the losses, thus decreasing the efficiency. Furthermore, the use of two main exciting windings for each phase in the manner needed to secure independent adjustment of voltage and frequency involves the production of exciting ampere turns having opposing components, thus further decreasing the efficiency. Also, the use of two main exciting windings and two control means per phase increases the cost of the apparatus. In addition, if it is desired to reverse the phase sequence of the voltages of this generator, it will be necessary to provide additional control means, thus further complicating and increasing the cost of the apparatus.

Modern industry, therefore, needs a low frequency generator having minimum energy losses and a single regulating device for simultaneously varying the voltage and frequency according to a predetermined law. So far as I know, this type of generator has not been provided for by the prior art, and it is the object of my invention to provide such a generator. Briefly described, my invention provides a generator which employs a single regulating device for the exciting windings, and which has no opposing components of exciting ampere turns when functioning under the same service conditions as the generator of the previously referred to patent. In the preferred form of my generator the single regulating device is employed to change the time phase or the magnitude, or both, of the voltage impressed on each main exciting winding, whereas in modifications of the preferred form the single regulating device is employed to vary the relative magnitudes of the excitations of the main and auxiliary exciting windings. In the preferred form, the single regulating device enables me simultaneously to vary the voltage and frequency in accordance with a predetermined law, with variation of the frequency from some particular value to zero and up to a particular value with reversed phase sequence, and with a stable minimum voltage at zero frequency as well as a stable voltage at all other frequencies, whereas in the modifications of the preferred form the single regulating device enables me simultaneously to vary the voltage and frequency in accordance with a predetermined law, with variation of the frequency from some particular value to zero, and with a stable minimum voltage at zero frequency as well as a stable voltage at all other frequencies.

My invention, however, will be best understood from the following description when considered in connection with the accompanying drawings, while those features of my invention which are believed to be novel and patentable are pointed out in the appended claims.

Figures 6, 7:
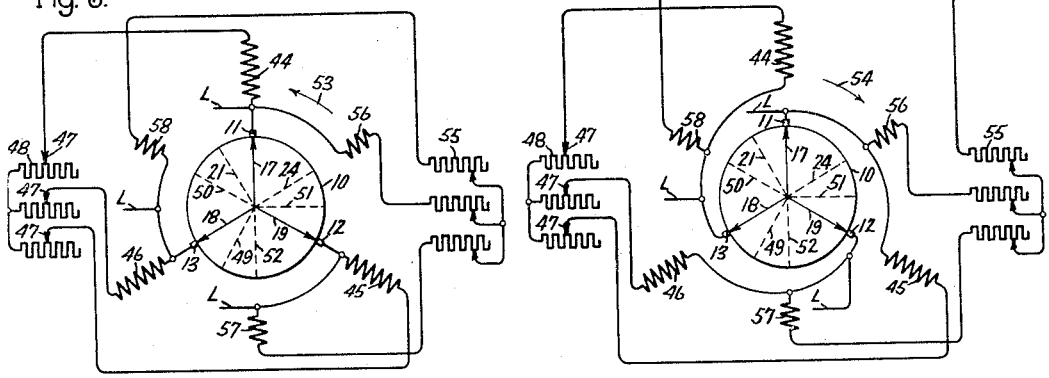
Figure 8:
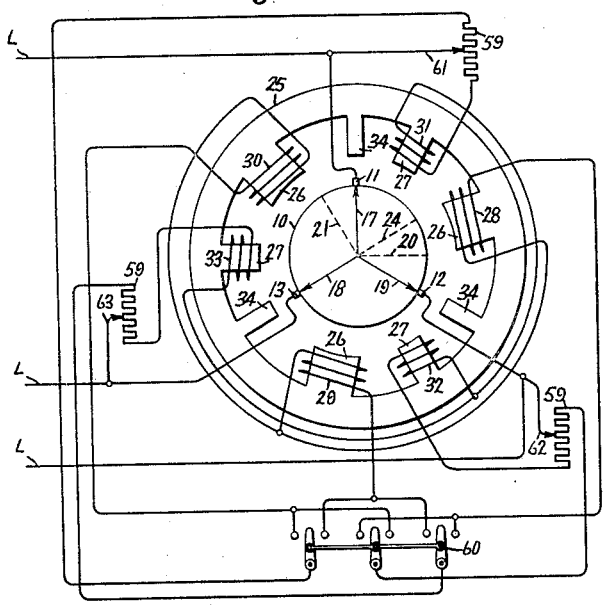
Figure 9:
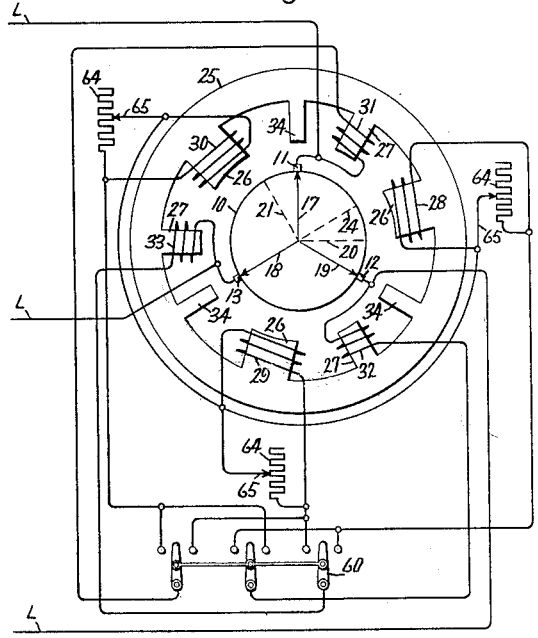
Figure 10:
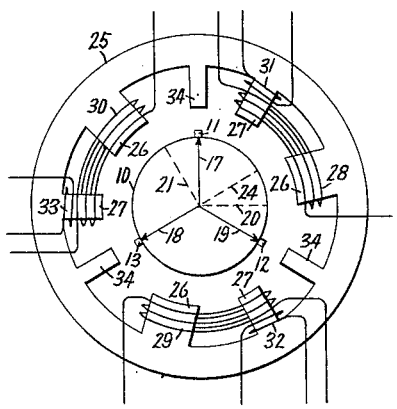
Figure 11:
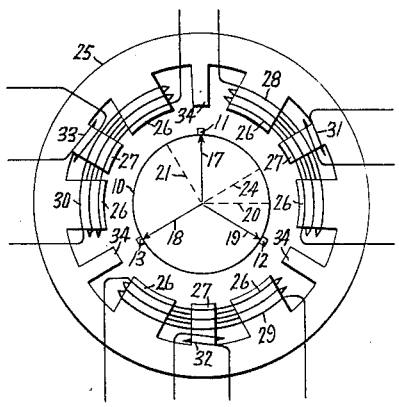
Figure 12:
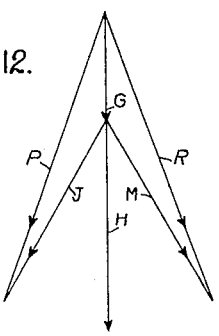

In the drawings, Figs. 1, 1A, 1B and 1C are diagrammatic representations of a self-excited commutator type generator employing a commutated armature winding and having its exciting windings arranged and connected so that it will generate polyphase voltages of zero frequency, i. e., direct current voltages, these figures being shown to assist the explanation and understanding of my invention. Fig. 2 represents a preferred form of my generator having two exciting windings per phase arranged to function as a single exciting winding, and having a single regulating device for changing the time phase, or the magnitude, or both, of the voltages impressed on the exciting windings. Figs. 3 and 4 diagrammatically represent the generator of Fig. 2 with its exciting windings in their resultant magnetic axes when the regulating device is adjusted so that the generator delivers polyphase voltages having a counter-clockwise and a clockwise phase sequence respectively. Fig. 5 represents another preferred form of my generator having a main and an auxiliary exciting winding for each phase, and a single regulating device for changing the time phase or the magnitude, or both, of the voltages impressed on the main exciting windings. Figs. 6 and 7 diagrammatically represent the generator of Fig. 5 with its exciting windings in their resultant magnetic axes when the regulating device is adjusted so that the generator delivers polyphase voltages having a counterclockwise and a clockwise phase sequence respectively. Figs. 8 and 9 represent modifications of the preferred form shown in Fig. 5, the single regulating device in Figs. 8 and 9 being employed for simultaneously varying the relative magnitudes of the excitations of the main and auxiliary exciting windings, and switching means being employed for changing the time phase of the voltages impressed on the main exciting windings. Figs. 10 and 11 represent modifications of the arrangement of the main and auxiliary exciting windings and their pole pieces from that shown in Figs. 5, 8, and 9. Fig. 12 is a vector diagram useful in explaining why the main and auxiliary exciting windings in the generators shown in Figs. 5, 8 and 9 have no opposing components of exciting ampere turns. Similar parts in the various figures are represented by the same reference characters.

In Fig. 1 of the drawings, the generator comprises a commutator 10 connected to a twopole, direct current type armature winding having a coil pitch of 180 electrical degrees, wherein each ingoing or "lead in" conductor is in the exact angular position of its commutator segment, the corresponding return conductor being removed 180 electrical degrees due to the coil pitch, all in a manner well understood and familiar in the literature and the conventions of the art but not shown herein for the sake of simplicity. Three equally spaced brushes 11, 12, and 13 rest on the commutator, and three equally spaced exciting windings 14, 15 and 16 are connected in star to the brushes as shown. Three lines, represented by L, are connected to the commutator brushes for supplying electric energy from the generator to any type of electrical apparatus. It is obvious that the arrangement of brushes and exciting windings are those of a three-phase machine. This generator and the generators shown in the remaining figures are usually provided with compensating and interpole windings, and the armature winding of these generators is rotated by some suitable driving means; but I have not shown these windings nor the driving means in any of the figures, since they are well known to those skilled in the art and their omission from the figures greatly simplifies the latter. With a three-phase or other polyphase arrangement of the brushes on the commutator, the armature winding is in certain respects the equivalent of a mesh-connected winding, and the voltages from an imaginary three-phase Y point within the armature winding to each of the brushes may be symbolically represented by the three vectors 17, 18 and 19, the difference of potential between any two commutator brushes then being the resultant of the two voltage vectors pointing to the two brushes in question, i. e., 12—11, 11—13 and 13—12.

Assume that in the magnetic circuit of the generator shown in Fig. 1 there exists any one of three residual magnetic fluxes whose axes may be represented by dotted lines 20, 21 and 22, respectively; that these lines are 90 electrical degrees in space from vectors 17, 18 and 19, respectively; and that the physical and resultant magnetic axes of exciting windings 14, 15 and 16 are coincident with lines 20, 21 and 22, respectively. The rotation of the armature winding in the residual flux whose axis is represented by line 20 causes the armature winding to generate the imaginary Y point to brush voltage vector 17, and, similarly, the rotation of the armature winding in one of the residual fluxes whose axes are represented by lines 21 and 22 causes the armature winding to generate one of the imaginary Y point to brush voltage vectors 18 and 19, respectively. Since the exciting windings 14, 15 and 16 are connected in star with their free ends connected to brushes 11, 13 and 12, respectively, the voltages impressed on exciting windings 14, 15 and 16 will be those represented by vectors 17, 18 and 19, respectively. Now assume that with the inner ends of the exciting windings connected to the commutator brushes, as shown in the drawings, and a residual flux in one of the axes 20, 21 and 22, the generated voltage causes a current flow through the corresponding one of the exciting windings 14, 15 and 16 in such a direction as to produce a magnetic flux in the assumed one of the axes 20, 21 and 22 which assists the residual flux in its axis, thus not only sustaining the residual flux but increasing the total flux in the originally assumed axis. This action is similar to that which occurs during the building up of the generated voltage in a self-excited direct current machine. Although Fig. 1 shows a true polyphase arrangement as the assumed directional axis can be freely chosen, nevertheless the latter generates polyphase voltages of zero frequency, i. e., direct current voltages, and the voltages will build up to stable values under the same general conditions as in direct current machines.

To illustrate the complete freedom of choice in the assumption of an axis of residual flux, assume that the residual flux of the generator shown in Fig. 1 is not represented in direction by one of the lines 20, 21 and 22, but is displaced therefrom. In this case the rotation voltage from an imaginary Y point in the armature winding to a commutator brush due to the residual flux, instead of being vector 17, 18 or 19 will have two components which will cause to flow in two exciting windings currents of such magnitudes as to produce a resultant magnetizing force having the same strength as before, but whose axis is shifted from its former axis by the angle which the residual flux has been displaced, thus again producing a flux which sustains or enlarges the residual flux in the new axis. It should, therefore, be clear that in this case the generator will also generate polyphase voltages of zero frequency.

The following explanation when considered in connection with Figs. 1A and 1B should assist in understanding the effect of changing the pitch of the armature winding and what must be done to cause the generator to develop zero frequency voltages when the pitch of the armature winding is otherwise than 180 electrical degrees. In Fig. 1A, the armature winding has a pitch of 180 electrical degrees, and the magnetic axis of that part of the armature winding between brushes A and B is in the direction of vector A—B, the return conductors of part A—B being shown as zone C—D. The voltage generated in conductors A—B and C—D by rotation is due to and in phase with the magnetic flux along the axis $ab$, which is perpendicular to the magnetic axis of the considered armature part A—B. If this voltage be applied, as shown, to an exciting winding 14 whose magnetic axis is $ab$, and this voltage is applied in a direction sense such that the current flowing through the exciting winding tends to increase the flux along $ab$, then the flux will build up along the axis $ab$ until limited by saturation, with no tendency to shift to another axis.

In Fig. 1B, the return conductor zone C—D is shown as moved counter-clockwise from the position shown in Fig. 1A, hence the pitch of the armature winding has been shortened by the angle E as shown in Fig. 1B. Although the conductors A—B are still generating voltage due to and in phase with the flux along axis $ab$, the conductors C—D generate voltage due to and in phase with flux along axis $a''b''$. The resultant voltage generated in conductors A—B and C—D may thus be said to be due to and in phase with the flux along the resultant axis $a'b'$, shifted half as many electrical degrees from $ab$ as the electrical degrees by which the pitch of the armature winding has been shortened. Now, in order for exciting winding 14 to cause the excitation of the flux along the resultant axis $a'b'$ when there is impressed thereon the resultant voltage of conductors A—B and C—D, it must be shifted so as to have its magnetic axis along $a'b'$ as shown. It is apparent that the resultant magnetic axis of the considered portion A—B and C—D of the armature winding has been shifted the same amount and in the same direction as that of exciting winding 14. The magnetic axis of exciting winding 14 is, therefore, still 90 electrical degrees from the magnetic axis of that part of the armature winding whose rotation voltage is impressed on it. Inasmuch as the same reasoning applies to any number of parts of the armature winding and corresponding exciting windings, it is apparent that in a polyaxial self-excited commutator generator such as here considered, a necessary condition for steady excitation in any one axis, i. e., zero frequency polyphase self-excitation, is that the magnetic axis of an exciting winding be removed 90 electrical degrees from the magnetic axis of that portion of the armature winding whose rotation voltage is impressed on it.

Fig. 1 shows this principle applied to a three phase arrangement having an armature winding with a pitch of 180 electrical degrees. In this figure, the relation of voltages 13—11, 11—12 and 12—13 to the voltages 17, 18 and 19 impressed on exciting windings 14, 15 and 16, respectively, has been previously explained. Although voltages 17, 18 and 19 are not the rotation voltages of any physical portion of the armature winding, if, as previously described, we ascribe to each of them a fictitious or virtual portion of the armature winding, then it is evident that the magnetic axes of these winding portions differ from the magnetic axes 13—11, 11—12, and 12—13, respectively, just as voltages 17, 18 and 19 differ from the voltages 13—11, 11—12, and 12—13, respectively. In order to preserve the 90 electrical degrees relationship required for zero frequency self-excitation, the magnetic axes of exciting windings 14, 15 and 16 must be, as shown, at 20, 21 and 22, respectively, i. e., 90 electrical degrees from the magnetic axes 17, 18 and 19, respectively, of those fictitious or virtual portions of the armature winding whose rotation voltages are impressed on them.

Fig. 1C shows this same principle applied to a three-phase arrangement having an armature winding with a pitch of 180 electrical degrees, but with the actual measurable voltages 12—11, 11—13, and 13—12 impressed on exciting windings 14, 15 and 16, respectively. As shown in this figure, the exciting windings 14, 15 and 16 have been shifted so that their magnetic axes are represented by 20', 21' and 22', respectively, which in turn are 90 electrical degrees from the magnetic axes 12—11, 11—13 and 13—12, respectively. It is therefore clear that the magnetic axis of each exciting winding is 90 electrical degrees from the magnetic axis of that real part of the armature winding whose rotation voltage is impressed on it.

From the description given in connection with Figs. 1, 1A, 1B, and 1C, it should be clear that polyphase voltages having zero frequency will be generated whenever the resultant magnetic axis of each exciting winding is 90 electrical degrees from the magnetic axis of that fictitious or real part of the armature winding whose rotation voltage is impressed on the considered exciting winding, and this will be hereinafter referred to as the zero frequency magnetic axes of the exciting windings. I therefore wish it clearly understood that wherever I state, either in the specification, or claims, that the resultant magnetic axis of an exciting winding is displaced from its zero frequency magnetic axis, I mean that the resultant magnetic axis of the exciting winding is displaced less than 90 electrical degrees from the magnetic axis of that fictitious or real part of the armature winding whose rotation voltage is impressed on the considered exciting winding.

If the exciting windings in Fig. 1 are shifted in space with respect to the rest of the generator, and if the currents in the exciting windings are in time phase with the voltages impressed thereon, then the voltages generated in the armature winding due to a residual flux will cause the currents flowing in the exciting windings to produce a magnetic flux in a different axis from that of the residual flux, hence the latter, instead of sustaining itself will tend to set up a new flux in a different space position. A particular flux is thus tending to produce another flux displaced in space from its own position, and if there were no inductive voltages in the exciting windings there would be a magnetic field revolving at infinite velocity and the armature would generate alternating current voltages having infinite frequency. Since there is in each exciting winding a considerable inductive voltage, the actual frequency of the generated voltages in a steady state condition is of such a value that the time angle of lag of the current in each exciting winding behind the voltage impressed thereon is equal to the space shift in electrical degrees of the exciting windings from their zero frequency positions. With the exciting windings shifted in space from their zero frequency positions, the necessary condition for self-excitation with generation of alternating current voltages is that the component of the voltage impressed on each exciting winding which is in phase with the resistance drop therein should be at least as large as the resistance drop corresponding to the current in the exciting winding necessary to create the flux which produces the generated voltage. When the exciting windings are shifted counter-clockwise in space from their zero frequency positions, the generated voltages have a counter-clockwise phase sequence and when the exciting windings are shifted clockwise in space from their zero frequency positions the generated voltages have a clockwise phase sequence.

It can be proved mathematically that the frequency of the generated voltages is directly proportional to the speed at which the armature winding is rotated, is directly proportional to the sine of the angle which the exciting windings are shifted from their zero frequency positions, is inversely proportional to the number of turns in the exciting windings, and is entirely independent of the resistances of the exciting winding circuits and of saturation in the magnetic circuit of the generator. The magnitude of the generated voltages can be controlled by variation of resistances connected in series with the exciting windings.

Having outlined the basic principles of generating in a polyphase commutator type machine direct current voltages, or alternating current voltages with either phase sequence, I will now describe several embodiments of my generator in which these principles are utilized in such a manner and by such simple regulating means as to satisfy the needs of modern industry described near the beginning of this specification.

I prefer to describe my invention in connection with a three-phase generator having a direct current type armature winding with a coil pitch of 120 electrical degrees, such as shown, for example, in United States Patent No. 1,084,040, Sherbius, January 13, 1914, assigned to the assignees of this application. This type of armature winding is well known to those skilled in the art, and, therefore, I have not illustrated it in any of the following figures, in order to simplify them. My invention, however, is applicable to any polyphase generator employing a direct current type armature winding, irrespective of the coil pitch of the armature winding, and, therefore, I wish it clearly understood that my invention is not to be limited to the particular type of generator selected for the purpose of illustrating the invention.

In Fig. 2, the commutator 10 is connected to a direct current type armature winding having a coil pitch of 120 electrical degrees, and three brushes 11, 12 and 13 rest on the commutator, the circumferential spacing between the brushes being substantially 120 electrical degrees. Assume that the armature coil pitch has been shortened from 180 to 120 electrical degrees in a counter-clockwise direction. The three phase voltages generated between an imaginary Y point in this armature winding and the brushes may also be symbolically represented by vectors 17, 18 and 19, but due to the fact that this armature winding has a coil pitch of 120 electrical degrees the magnetic axis of each fictitious part of the armature winding will be displaced 30 electrical degrees from its voltage vector and in a counter-clockwise direction for the example selected. Thus, for example, that fictitious part of the armature winding whose generated voltage is represented by vector 17 will have a magnetic axis represented by dotted line 21 which is 30 electrical degrees counter-clockwise from vector 17. It follows that in order to generate voltages with zero frequency, the resultant magnetic axis of each exciting winding on which one of the voltages 17, 18 or 19 is to be impressed should be 30 electrical degrees counter-clockwise from that shown in Fig. 1. Thus, for example, in order to generate voltages with zero frequency in Fig. 2, the resultant magnetic axis of that exciting winding on which is impressed voltage vector 17 should not be represented by line 20, as in Fig. 1, but should be represented by line 24 in Fig. 2. A magnet frame 25 has three pairs of adjacent pole pieces, each pair consisting of a relatively large pole piece 26, which is proportioned not to become readily saturated, and a relatively small pole piece 27, which is proportioned to become readily saturated. Exciting windings 28, 29 and 30, respectively, surround the three large pole pieces 26, and exciting windings 31, 32 and 33, respectively, surround the three small pole pieces 27. Three pole pieces represented by 34 are adapted to be surrounded by interpole windings, but these windings are not shown, as their illustration is unnecessary to the description of my invention. Three impedances, which are preferably constructed and shown as non-inductive resistances, are represented by 35, 36 and 37. Brushes 11, 12 and 13 may respectively be connected to three corresponding ends of the resistances by closing switches 38, and may respectively be connected to the other three corresponding ends of the resistances by closing switches 39. It is clear that when switches 38 and 39 are closed the resistances are connected in mesh to the brushes. Three adjustable contacts 40, 41 and 42 are adapted to slide over resistances 36, 37 and 35, respectively, or any other suitable means may be employed for connecting each contact to any one of a desired number of points on its resistance. Each of contacts 40, 41 and 42 is connected to a two-way switch 43. One end of each of exciting windings 31, 32 and 33 are connected together. From the connections between the exciting windings and switches 43, it can be seen that when switches 43 are closed to the right all the exciting windings are connected in star to contacts 40, 41 and 42, with one leg of the star consisting of windings 28 and 31 connected in series, another leg of the star consisting of windings 29 and 32 connected in series, and the third leg of the star consisting of windings 30 and 33 connected in series; and when switches 43 are closed to the left the exciting windings 31, 32 and 33 are connected in star to contacts 40, 41 and 42, and windings 28, 29 and 30 are open.

I will now describe the operation of the structure shown in Fig. 2 in connection with Figs. 3 and 4. In Fig. 2, each group of pole pieces 26 and 27 exert their entire magnetic effect on the armature winding between two commutator brushes, hence their virtual magnetic axes are midway between the two brushes. Thus, for example, the pole pieces 26 and 27 surrounded by exciting windings 28 and 31 exert their entire magnetic effect on the armature winding between brushes 11 and 12, hence the virtual magnetic axes of these pole pieces and their exciting windings, whether one or both exciting windings are energized, are coincident with line 24, which is midway between vectors 17 and 19. That is to say, the voltages between the commutator brushes, and the voltages between an imaginary Y point in the armature winding and the commutator brushes, will be the same as though all the magnetic flux between brushes 11 and 12 were concentrated along the axis 24. In Fig. 1, I assumed that when the inner end of an exciting winding is connected to a commutator brush the resultant magnetic axis of the exciting winding coincides with the positive direction of its physical axis and thus secures the actual excitation required for the assumed voltage rather than its reverse. In order to simplify the explanation of my invention I will make the same assumption in the other figures. In Fig. 2, however, it will be seen that the inner ends of exciting windings 31, 32 and 33 are connected together and their outer ends are connected to the inner ends of exciting windings 28, 29 and 30, respectively, and the virtual magnetic axes of the two exciting windings surrounding each two pole pieces constituting a group are midway between pairs of commutator brushes with these two exciting windings connected in series; therefore, irrespective of which way switches 43 are closed, the exciting windings in Fig. 2 may be considered as the equivalent of three exciting windings having their inner ends connected together, their outer ends connected to contacts 40, 41 and 42, and the virtual magnetic axis of each equivalent exciting winding midway between a pair of commutator brushes but in the negative direction. Since contacts 40, 41 and 42 are in operation connected to the commutator brushes through the resistances 35, 36 and 37 and the switches connected thereto, the outer ends of these three equivalent exciting windings will be connected to the commutator brushes. Therefore, in view of the assumption previously referred to, it is clear that the resultant magnetic axis of each of the three equivalent exciting windings will be displaced 180 electrical degrees from its virtual magnetic axis midway between its two commutator brushes, and this is the same as if each equivalent exciting winding were physically moved 180 electrical degrees from its position and had its positive or inner end, instead of its outer end, connected to a commutator brush.

Thus, assume, for example, that switches 43 are closed to the right, then if switches 38 are closed the exciting windings will be connected so that their magnetic effects are the same as the arrangement shown in Fig. 3; whereas if switches 39 are closed the exciting windings will be connected so that their magnetic effects are the same as the arrangement shown in Fig. 4. The reason for this is that when switches 38 are closed the brush 11 in Fig. 2 is directly connected to the outer end of exciting winding 29 and in effect is connected to the outer end of exciting winding 32, hence the equivalent of this arrangement in Fig. 3 is brush 11 connected to the inner end of exciting winding 44, whose axis is 180 electrical degrees from the virtual magnetic axis of windings 29 and 32; the brush 12 in Fig. 2 is directly connected to the outer end of winding 30 and in effect is connected to the outer end of winding 33, hence the equivalent of this arrangement in Fig. 3 is the brush 12 connected to the inner end of exciting winding 45, whose axis is 180 electrical degrees from the virtual magnetic axes of windings 30 and 33; and the brush 13 in Fig. 2 is directly connected to the outer end of winding 28 and in effect is connected to the outer end of winding 31, hence the equivalent of this arrangement in Fig. 3 is brush 13 connected to the inner end of exciting winding 46, whose axis is 180 electrical degrees from the virtual magnetic axes of windings 28 and 31. When switches 39 in Fig. 2 are closed, exciting windings 29 and 32 are connected to brush 13, exciting windings 30 and 33 are connected to brush 11, and exciting windings 28 and 31 are connected to brush 12, and the equivalent of these connections is shown in Fig. 4. With switches 38 or 39 closed in Fig. 2, it is possible to change the amount of resistance in series with the exciting windings by moving contacts 40, 41 and 42, hence the equivalent of this arrangement is shown in Figs. 3 and 4 by adjustable contacts 47 sliding over resistances 48.

In Figs. 3 and 4, the lines 21 and 24 represent the same as that described in Fig. 2, namely, line 21 represents the magnetic axis of that fictitious part of the armature winding which generates the voltage represented by vector 17, and line 24 is 90 electrical degrees from line 21, thus representing the zero frequency magnetic axis of exciting winding 44. Similar representations in Fig. 3 with respect to voltage vector 18 are shown by lines 49 and 50, and with respect to voltage vector 19 are shown by lines 51 and 52. In Fig. 3, it is seen that the resultant magnetic axes of exciting windings 44, 45 and 46 are displaced 60 electrical degrees in a counter-clockwise direction from their zero frequency magnetic axes 24, 50 and 52, respectively, whereas in Fig. 4 the resultant magnetic axes of these exciting windings are displaced 60 electrical degrees in a clockwise direction from their zero frequency magnetic axes. Also, in Fig. 4, voltage 17 is impressed on exciting winding 45 instead of winding 44 as shown in Fig. 3, and the same is correspondingly true of the other exciting windings. From the explanation given in connection with Figs. 1, 1A, 1B and 1C, it follows that with the arrangement of Fig. 3 there will be generated alternating current voltages having a counter-clockwise phase sequence, as represented by arrow 53, whereas with the arrangement of Fig. 4 there will be generated alternating current voltages having a clockwise phase sequence, as represented by arrow 54, the frequency being the same in both cases. It is, therefore, evident that by closing switches 38 in Fig. 2 the machine will generate alternating current voltages with a counter-clockwise phase sequence, and by closing switches 39 the machine will generate alternating current voltages with a clockwise phase sequence, the frequency being the same in both cases, and by adjusting contacts 40, 41 and 42 I can vary the magnitude of the voltages generated. It is clear that by opening switches 38 and closing switches 39, or vice versa, I change the time phase of the armature winding voltage impressed on each exciting winding by 120 electrical degrees, hence providing a simple method and means for changing the phase sequence of the generated voltages.

If switches 38 and 39 are closed, it is clear that I can change the time phase of the armature voltage impressed on each exciting winding in any desired number of steps over a range of 120 electrical degrees by moving each of contacts 40, 41 and 42 from its extreme position adjacent to its switch 38 to its extreme position adjacent to its switch 39, and vice versa. When each contact is at its extreme position adjacent to its switch 38 the generator delivers alternating current voltages with a counter-clockwise phase sequence, and when each contact is at its extreme position adjacent to its switch 39 the generator delivers alternating current voltages with a clockwise phase sequence, the frequency being the same in both cases. Consequently, when each contact is at that position on its resistance where the value of the resistance from the contact to its switch 38 is the same as that from the contact to its switch 39, these being the midpoints of the resistances when they have equal values of resistance per unit of length, then the generator develops voltages having neither phase sequence, hence the voltages are of zero frequency, i. e., direct current voltages, and, therefore, I will call these positions of contacts 40, 41 and 42 their zero frequency positions. It is, therefore, clear that by merely moving contacts 40, 41 and 42 I can change the frequency of the generated voltages in any number of steps desired, from its maximum value with a counter-clockwise phase sequence of the voltages to zero frequency and up to its maximum value with a clockwise phase sequence of the voltages, and vice versa, thus providing a simple method of and means for simultaneously controlling the frequency and phase sequence of the generated voltages.

Furthermore, with switches 38 and 39 closed, when each of contacts 40, 41 and 42 is at its extreme position adjacent to its switch 38 or 39 there is no resistance in series with the exciting windings, and when each contact is at its zero frequency position the maximum value of resistance is in series with each exciting winding. Consequently, by moving contacts 40, 41 and 42 I not only vary the frequency and control the phase sequence of the generated voltages, but I also simultaneously control the magnitude of the generated voltages, the voltages having the minimum value at zero frequency and the maximum values at maximum frequency with either phase sequence, these being just the characteristics desired for many industrial applications. I obtain the usually desired minimum stable voltage at zero frequency in the following manner. When contacts 40, 41 and 42 are at their zero frequency positions the switches 43 should be closed to the left, thus energizing only windings 31, 32 and 33 which surround the pole pieces 27. These windings and pole pieces are so proportioned that with contacts 40, 41 and 42 at their zero frequency positions the pole pieces are substantially saturated and provide the necessary flux for the generator to develop the desired minimum voltage, hence generating the desired minimum stable voltage at zero frequency. When contacts 40, 41 and 42 are moved from their zero frequency positions toward either of their extreme positions the switches 43 should be closed to the right, thus energizing all the exciting windings, hence simultaneously increasing the magnitude and frequency of the generated voltages with either phase sequence as the contacts are moved.

It is, of course, obvious that when the difference between the desired stable minimum voltage at zero frequency and the desired maximum voltage at maximum frequency is sufficiently small, then each pair of pole pieces 26 and 27 may be combined into a single pole piece surrounded by a single exciting winding which is always energized, the switches 43 being then omitted. In this case the exciting windings and pole pieces are so proportioned that with contacts 40, 41 and 42 at their zero frequency positions the pole pieces are sufficiently saturated and provide sufficient flux so that the generator develops the desired stable minimum voltage, and when the contacts are moved to either of their extreme positions the increased voltage impressed on each exciting winding is sufficient to increase the flux in the pole pieces so that the generator develops the desired maximum voltage. A generator of this type has been built, tested, and placed in commercial service, and has given very satisfactory operating results.

In Fig. 5, the positions of pole pieces 26 and 27 in each group of pole pieces have been interchanged in order to simplify the connections of the exciting windings, but from the description given in connection with Fig. 2 it will be obvious that the relative positions of pole pieces 26 and 27 in each group is immaterial since they have the same virtual magnetic axis. Also, in Fig. 5 the exciting windings have been connected into two star connected groups, one group consisting of windings 31, 32 and 33, which surround pole pieces 27, and the other group consisting of windings 28, 29 and 30, which surround pole pieces 26. It is also seen that the inner ends of windings 31, 32 and 33 are connected to brushes 11, 12 and 13, respectively, and their outer ends are connected to adjustable resistances 55, whereas the inner ends of windings 28, 29 and 30 are connected together and their outer ends are connected to adjustable contacts 40, 41 and 42, respectively. The remaining connections are similar to those in Fig. 2.

From the description given in connection with Fig. 2, it will be clear that in Fig. 5 the virtual magnetic axes of exciting windings 28 and 31 are midway between the brushes 11 and 12, whereas their resultant magnetic axes will depend on which end of each exciting winding is connected to a commutator brush, and the same will, of course, be true with the other exciting windings. In Fig. 5, the inner ends of exciting windings 31, 32 and 33 are permanently connected to brushes 11, 12 and 13, respectively; therefore, the equivalent of this arrangement is shown in Figs. 6 and 7 by the exciting windings 56, 57 and 58, which have their inner ends connected to brushes 11, 12 and 13, respectively. It is seen that the resultant magnetic axes of windings 56, 57 and 58 coincide with their respective zero frequency magnetic axes. Since the outer ends of exciting windings 28, 29 and 30 in Fig. 5 will be connected to the commutator brushes, it is clear from the description given in connection with Figs. 2, 3 and 4 that when switches 38 in Fig. 5 are closed these exciting windings will be connected so that their magnetic effects are the same as the arrangement of the exciting windings 44, 45 and 46, in Fig. 6, whereas when switches 39 in Fig. 5 are closed, the exciting windings 28, 29 and 30 will be connected so that their magnetic effects are the same as the arrangement of the exciting windings 44, 45 and 46 in Fig. 7. In Fig. 6, the axes of exciting windings 44, 45 and 46 are displaced 60 electrical degrees in a counter-clockwise direction from their zero frequency positions, whereas in Fig. 7 the axes of these exciting windings are displaced 60 electrical degrees in a clockwise direction from their zero frequency positions. The fluxes produced by exciting windings 28, 29 and 30 in Fig. 5 are considerably greater than those produced by exciting windings 31, 32 and 33, hence it is clear that in Figs. 6 and 7 the two fluxes produced by each pair of exciting windings connected to a commutator brush combine into a total flux which would be produced by a single exciting winding whose axis in Fig. 6 would be almost 60 electrical degrees in a counter-clockwise direction from its zero frequency position, and in Fig. 7 would be almost 60 electrical degrees in a clockwise direction from its zero frequency position. It is, therefore, clear that when switches 38 in Fig. 5 are closed the generator develops alternating current voltages with a counter-clockwise phase sequence, and when the switches 39 are closed the generator develops alternating current voltages with a clockwise phase sequence, the frequency being the same in both cases and the magnitude of the voltages being adjusted by moving contacts 40, 41 and 42. Consequently, when switches 38 and 39 are both closed, by moving contacts 40, 41 and 42 I can simultaneously decrease, in any desired number of steps, the magnitudes and frequency of the generated voltages from their maximum values with a counter-clockwise phase sequence of the voltages to zero frequency with a stable minimum voltage, and then simultaneously increase the magnitudes and frequency of the generated voltages to their maximum values with a clockwise phase sequence of the voltages, and vice versa.

The generator develops a stable minimum voltage at zero frequency, and its voltages are stable at all frequencies, because its pole pieces 27 are so proportioned that they are substantially saturated even when the generator is delivering its minimum voltage at zero frequency. Since pole pieces 27 are substantially saturated at all frequencies and their resultant magnetic axes do not change as the frequency is changed, the voltages delivered by the generator may be thought of as consisting of two components, one component having a constant magnitude at all frequencies because it is due to the flux of pole pieces 27, and the magnitude of the other component increasing with increase in frequency, and vice versa, because it is due to the flux of pole pieces 26, thus delivering voltages having the characteristics desired for many applications. Although adjusting resistances 55 may slightly vary the magnitudes and frequency of the generated voltages, their real object is to limit the currents in exciting windings 31, 32 and 33 to the values necessary to saturate pole pieces 27 when the generated voltages are above their minimum value, in order to prevent overheating of these windings. Consequently, if these windings are so designed that it is unnecessary to insert resistances in series with them to prevent their overheating during the expected operation of the generator, then resistances 55 may be omitted.

In Fig. 8, the exciting windings are connected in two star connected groups, one group consisting of windings 31, 32 and 33, whose outer ends are connected together and whose inner ends are connected to three ends of resistances 59, and the other group consisting of windings 28, 29 and 30, whose inner ends are connected together and whose outer ends are adapted to be connected to the other three ends of resistances 59 through a two-way switch 60. It is obvious that the two groups of exciting windings are connected in series with each other and in series with resistances 59. The brushes 11, 12 and 13 are connected to adjustable contacts 61, 62 and 63, respectively, these contacts being adapted to slide over resistances 59. Assuming that switch 60 is closed to either side, it is clear that by moving contacts 61, 62 and 63 upward I increase the magnitudes of the voltages impressed on exciting windings 28, 29 and 30, and simultaneously tend to decrease the magnitudes of the voltages impressed on exciting windings 31, 32 and 33, and by moving these contacts downward the reverse is true. Also, by tracing out the connections it will be seen that when switch 60 is closed to the right the outer ends of exciting windings 28, 29 and 30 are connected to those resistances 59 which are connected to brushes 13, 11 and 12, respectively, whereas when switch 60 is closed to the left the outer ends of these windings are connected to those resistances 59 which are connected to brushes 12, 13 and 11, respectively.

From the description given in connection with Figs. 5, 6 and 7, it will be seen that when switch 60 in Fig. 8 is closed to the right the exciting windings are connected so that their magnetic effects are the same as the arrangement shown in Fig. 6, and when switch 60 is closed to the left the exciting windings are connected so that their magnetic effects are the same as the arrangement shown in Fig. 7. Consequently, when switch 60 in Fig. 8 is closed to the right the generator develops alternating current voltages with a counter-clockwise phase sequence, and when switch 60 is closed to the left the generator develops alternating current voltages with a clockwise phase sequence. In each case the magnitudes and frequency of the generated voltages can simultaneously be increased in any desired number of steps by moving contacts 61, 62 and 63 upward, and simultaneously be decreased in any desired number of steps by moving these contacts downward. The reason for this can be most clearly explained in connection with one of the equivalent arrangements, as for example Fig. 6. In Fig. 6 it can readily be seen that the two fluxes produced by each pair of exciting windings connected to a commutator brush combine into a total flux whose magnitude and resultant magnetic axis is determined by the relative magnitudes of the two fluxes. For example, the fluxes produced by exciting windings 44 and 56 in Fig. 6 combine into a total flux whose magnitude and resultant magnetic axis is determined by the relative magnitudes of the two fluxes produced by these windings. The flux produced by exciting winding 56 is substantially constant because this winding is the equivalent of winding 31 surrounding a saturated pole piece 27 in Fig. 8, whereas the flux produced by exciting winding 44 is varied over a considerable range, because this winding is the equivalent of winding 29 surrounding a relatively large pole piece 26 in Fig. 8. Hence, the magnitude and resultant magnetic axis of the total flux produced by exciting windings 44 and 56 in Fig. 6 are simultaneously varied by changing the magnitude of the flux produced by winding 44. Since the magnitude of the total flux determines the magnitude of the generated voltages, and since the resultant magnetic axis of the total flux determines the frequency of the generated voltages, the magnitude and frequency of the generated voltages can simultaneously be varied by changing the magnitude of the flux produced by exciting winding 44. It should now be clear that the magnitude and frequency of the generated voltages can simultaneously be varied by moving contacts 61, 62 and 63 in Fig. 8, because such movement changes the magnitudes of the fluxes produced by exciting windings 28, 29 and 30. When contacts 61, 62 and 63 are at their extreme lower positions the frequency will be nearly zero if switch 60 is closed and when switch 60 is open the frequency will be zero, i. e., direct current voltages will be generated, and these voltages will have their minimum value and will be stable.

For the reasons explained in connection with Fig. 5, the saturated pole pieces 27 in Fig. 8 will cause the generated voltages to be stable at all frequencies, while the voltages may be thought of as consisting of two components, the magnitude of one component being substantially constant at all frequencies, and the magnitude of the other component increasing with increased frequency, and vice versa. It is also seen that when contacts 61, 62 and 63 are moved upward to increase the generator voltage and frequency there are increasing values of resistances 59 inserted in series with windings 31, 32 and 33, thus preventing the overheating of these windings at the higher generator voltages.

In Fig. 9, the inner ends of exciting windings 28, 29 and 30 are connected together, the inner ends of exciting windings 31, 32 and 33 are connected to brushes 11, 12 and 13, respectively, and the outer ends of windings 31, 32 and 33 are connected to the outer ends of exciting windings 29, 30 and 28, respectively, when switch 60 is closed to the right, whereas the outer ends of exciting windings 31, 32 and 33 are connected to the outer ends of exciting windings 30, 28 and 29, respectively, when switch 60 is closed to the left. In either case all the exciting windings are connected in star with each leg of the star consisting of one exciting winding surrounding a pole piece 27 in one group of pole pieces connected in series with an exciting winding surrounding a pole piece 26 in another group of pole pieces. Adjustable resistances 64 are connected across exciting windings 28, 29 and 30, and by moving adjustable contacts 65 the amount of resistance across each winding can be changed. It is clear that the magnitudes of the currents flowing in the exciting windings which surround pole pieces 26 are substantially directly proportional to the magnitudes of the currents flowing in the exciting windings which surround pole pieces 27 at any given position of contacts 65 on resistances 64, and that by changing the positions of these contacts the ratio between the magnitudes of these currents is changed.

Although with switch 60 closed to either side there are two exciting windings connected in series to each commuator brush, nevertheless when switch 60 is closed to the right the exciting windings in Fig. 9 are connected so that their magnetic effects are the same as the arrangement shown in Fig. 6, and when switch 60 is closed to the left the exciting windings are connected so that their magnetic effects are the same as the arrangement shown in Fig. 7. Consequently, when switch 60 is closed to the right the generator can deliver alternating current voltages with a counter-clockwise phase sequence, and when switch 60 is closed to the left the generator can deliver alternating current voltages with a clockwise phase sequence, and in each case the magnitude and frequency of the generated voltages can simultaneously be increased in any desired number of steps by moving contacts 65 upward, and simultaneously be decreased in any desired number of steps by moving contacts 65 downward. When contacts 65 are moved off resistances 64 the magnitude and frequency of the generated voltages are at their maximum values, and when contacts 65 are moved to their extreme lower positions the exciting windings 28, 29 and 30 are short-circuited and the generator develops its stable minimum voltage with zero frequency, i. e., direct current voltages with a stable minimum value are generated. Due to the saturated pole pieces 27, the generated voltages will be stable at all frequencies, while the voltages may be thought of as consisting of one component whose magnitude is substantially constant at all frequencies and another component whose magnitude increases with increased frequency, and vice versa.

From the description given in connection with Figs. 8 and 9, it will be clear that by changing the time phase of the voltages impressed on the exciting windings surrounding the pole pieces 26 I change the phase sequence of the generated voltages, whereas with a simple single regulating device I simultaneously vary the magnitude and frequency of the generated voltages. Some industrial applications require a variable frequency variable voltage supply, but do not require that the phase sequence of the generated voltages be reversed. The arrangements shown in Figs. 8 and 9 are well suited to satisfy these requirements, since the switch 60 may be omitted, thus leaving a single simple regulating device having a minimum amount of operating losses for obtaining the desired results.

It is clear that with respect to every two exciting windings that surround a group of pole pieces 26 and 27 in Figs. 5, 8, and 9, the time phase of the voltage impressed on the exciting winding which surrounds pole piece 27 is always different from the time phase of the voltage impressed on the exciting winding which surrounds pole piece 26.

Fig. 10 represents a modification where each pole piece 27 is not only surrounded by its own exciting winding, but is also surrounded by the exciting winding which surrounds the pole piece 26 in the same group of pole pieces. Fig. 11 represents a modification, where each group of pole pieces consists of a pole piece 27 between two pole pieces 26, with one exciting winding surrounding the pole piece 27 and another exciting winding surrounding all three pole pieces. The arrangements of pole pieces and exciting windings shown in Figs. 10 and 11 provide additional means for obtaining desired relationships between the magnitude and frequency of the generated voltages as they are simultaneously varied by any of the previously described single regulating devices, hence either of these arrangements may be used with any of the generators shown in Figs. 5, 8 and 9.

By employing the most appropriate of the illustrated arrangements of pole pieces and exciting windings, by properly proportioning the relative areas of the pole pieces and number of turns in the exciting windings, and by selecting a suitable value of regulating resistance with the proper number of control steps, manifold desired relationships between the magnitude and frequency of the generated voltage can be obtained with the single regulating resistance.

It will be obvious to those skilled in the art to which this invention relates that although I have not illustrated series exciting windings, compensating windings, or interpole windings, yet any or all of these windings may be used in my generator for well known purposes. Furthermore, since I have not shown a compensating winding, I have, for the sake of simplicity, stated throughout the specification that voltages generated in the armature winding are impressed on the exciting windings. However, a compensating winding is practically always used in order to neutralize the armature reaction and to balance the voltage induced in the armature winding by transformer action due to the exciting flux of the generator. It will therefore be evident to those skilled in the art that wherever I have stated in the specification and in the claims that voltages generated in the armature winding are impressed on the exciting windings, I mean, and so wish it understood, that voltages generated in the armature winding due to rotation thereof in the exciting flux are impressed on the exciting windings; in other words, that the terminal voltages of the generator are impressed on the exciting windings when a compensating winding is used.

I have not illustrated any means for initiating self-excitation of my generator, because the latter will most always have sufficient residual magnetism to start the process of self-excitation and build up to the voltage determined by the adjustment of its regulating resistance, and because any of the means well known to those skilled in the art may be used for initiating self-excitation if the generator has insufficient residual magnetism. Thus, for example, initiation of self-excitation may be accomplished by energizing the exciting windings for a short time with a sufficient value of direct or alternating current obtained from any suitable source. If alternating current is used it might be necessary to repeat the energization one or more times, because it might happen that the circuit from the alternating current source to the exciting windings is opened at that part of the cycle when no current is flowing through the exciting windings.

In the generator shown in Fig. 2, every two exciting windings having the same virtual magnetic axis are connected in series, hence the currents flowing therein have the same time phase. Thus, for example, exciting windings 28 and 31 are connected in series and the currents flowing through them have the same time phase. Consequently, every two exciting windings having the same virtual magnetic axis produce a total magnetizing flux whose effective value at any instant is the arithmetical sum of the individual fluxes produced by the two windings. From this it will be evident that, irrespective of the frequency of the voltages developed by the generator shown in Fig. 2, there are no opposing components of exciting ampere turns in the generator.

It is clear that when the generator shown in Fig. 5 develops zero frequency voltages, i. e., direct current voltages, every two exciting windings having the same virtual magnetic axis are traversed by currents having the same time phase. Thus, for example, the currents flowing in exciting windings 28 and 31 have the same time phase, hence the time phase relationship of these currents may be represented by vectors G and H, respectively, in Fig. 12, these vectors being in line with each other to indicate that there is no phase angle between the currents they represent. It is also clear that in the generator shown in Figs. 8 and 9 only exciting windings 31, 32 and 33 are energized when the generator develops zero frequency voltages, hence the current flowing in exciting winding 31, for example, may be represented by vector G in Fig. 12. It is obvious that this matter of phase angle is automatically eliminated when the generator shown in Figs. 8 and 9 develops zero frequency voltage, because at that time there is no current flowing in one out of every two exciting windings having the same virtual magnetic axis. When the generator illustrated in Figs. 5, 8 and 9 develops alternating current voltages of maximum frequency with either phase sequence, the voltages impressed on every two exciting windings having the same virtual magnetic axis are displaced 60 electrical time degrees. The reason for this is that although every two exciting windings having the same virtual magnetic axis are connected to commutator brushes spaced 120 electrical degrees apart, it is the relatively opposite ends of the two exciting windings that are connected to the corresponding brushes as previously described, hence it may be considered that the voltage is impressed in a positive direction on one of these two exciting windings, while it is impressed in a negative direction on the other of these two exciting windings, thus producing the effect of impressing two voltages displaced 60 electrical time degrees on these two exciting windings. Now, in accordance with my invention, I purposely select the relative constants of every two exciting windings having the same virtual magnetic axis, i. e., their relative resistances and reactances, so that the currents flowing therein are displaced from each other less than 90 electrical time degrees, and in the generators illustrated even less than 60 electrical time degrees, thus avoiding opposing components of exciting ampere turns in these two exciting windings. In the above manner, I can avoid opposing opponents of exciting ampere turns by maintaining the phase displacement between the currents flowing through these two exciting windings at less than 90 electrical time degrees, even when I impress voltages on these two exciting windings that are displaced more than 90 electrical time degrees. Thus, for example, the relative constants of exciting windings 28 and 31 in Figs. 5, 8 and 9, i. e., their relative resistances and reactances, are so selected that when the generator develops alternating current voltages of maximum frequency with either phase sequence, the currents flowing therein are displaced much less than 60 electrical time degrees. The time phase relationship of the currents flowing in exciting windings 28 and 31 may, therefore, be represented by vectors G and J, respectively, in Fig. 12 for maximum frequency of one phase sequence, and by G and M, respectively, in this figure for maximum frequency of the opposite phase sequence, the vectors J and M being each displaced much less than 60 degrees from vector H. The vector resultant of vectors G and J is represented by P, and the vector resultant of vectors G and M is represented by R. When the generator shown in Figs. 8 and 9 develops zero frequency voltage, the effective total flux of exciting windings 28 and 31 is represented by vector G in Fig. 12, because exciting winding 31 is at that time not energized, whereas when the generator shown in Fig. 5 develops zero frequency voltages, the effective total flux of exciting windings 28 and 31 is represented by the arithmetical sum of vectors G and H in Fig. 12. When the generator shown in Figs. 5, 8 and 9 develops alternating current voltages of maximum frequency the effective total flux of exciting windings 28 and 31 is represented by vector P in Figure 12 for one phase sequence and by vector R in this figure for the opposite phase sequence. The arithmetical sum of vectors G and H is larger than either G or H, and vectors P and R are larger than either of their respective components; hence under all generator operating conditions the effective total flux of exciting windings 28 and 31, when both are energized, is greater than the individual fluxes produced by the two windings, and the same will, of course, be true with all other exciting windings having the same virtual magnetic axis. It may, therefore, correctly be stated that also in the generator shown in Figs. 5, 8 and 9 there are no opposing components of exciting ampere turns in those exciting windings which have the same virtual magnetic axis.

I have illustrated and described how to obtain non-opposing components of exciting ampere turns in every group of exciting windings having the same virtual magnetic axis when the maximum time phase difference between the voltages impressed on the individual windings of the group is 60 electrical degrees, but from this disclosure it should be obvious to those skilled in the art to which the invention pertains that when this maximum time phase difference between the voltages is other than 60 electrical degrees it is readily possible to obtain similar results by selecting exciting windings with suitable relative constants so that the currents flowing in the individual exciting windings having the same virtual axis are displaced from each other less than 90 electrical time degrees. I therefore wish it clearly understood that my invention is not to be limited to the example illustrated and described for the sake of explaining my invention.

I have illustrated and described my invention with a generator having its exciting windings located in certain physical positions and with suitable connections to the exciting windings for shifting their axes so as to have their resultant magnetic axes in the desired positions, but it will be clear to those skilled in this art that by employing methods analogous to that described herein for shifting the axes of the exciting windings it is readily possible to obtain the desired resultant magnetic axes of the exciting windings, irrespective of their physical positions, and, therefore, I wish it clearly understood that my invention is not to be limited to the particular arrangement of exciting windings and connections thereto that I have illustrated for explaining the invention.

In accordance with the provisions of the patent statutes, I have described the principles of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. A self-exciting polyphase commutator type generator comprising a commutated armature winding having a plurality of circumferentially spaced apart brushes bearing on its commutator, a plurality of exciting windings with their magnetic axes displaced from each other, said armature winding and exciting windings being relatively rotatable, means for effecting a closed circuit between one end of each of said exciting windings, and connecting means between said brushes and said exciting windings for selectively connecting the remaining end of each exciting winding to either of two circumferentially spaced apart commutator brushes with said plurality of commutator brushes respectively connected to the ends of different exciting windings.

2. A self-exciting polyphase commutator type generator comprising a commutated armature winding having a plurality of circumferentially spaced apart brushes bearing on its commutator, a plurality of exciting windings with their magnetic axes displaced from each other, said armature winding and exciting windings being relatively rotatable, and connecting means between said brushes and said exciting windings for selectively impressing on each exciting winding either of two time phase displaced voltages generated by said armature winding.

3. A three-phase self-exciting commutator type generator comprising a rotatable commutated armature winding having a plurality of circumferentially spaced apart brushes bearing on its commutator, said brushes being spaced substantially 120 electrical degrees apart, a plurality of stationary exciting windings whose magnetic axes are spaced substantially 120 electrical degrees apart, means for connecting together one end of each of three exciting windings which are spaced substantially 120 electrical degrees apart, and switching means having two operating positions for respectively connecting the remaining end of each of said three exciting windings to either of two commutator brushes which are spaced substantially 120 electrical degrees apart, with said plurality of commutator brushes respectively connected to the ends of different exciting windings.

4. A self-exciting polyphase commutator type generator comprising a commutated armature winding having a plurality of circumferentially spaced apart brushes bearing on its commutator, a plurality of exciting windings with their magnetic axes displaced from each other, said armature winding and exciting windings being relatively rotatable, connecting means between said brushes and said exciting windings for impressing on each exciting winding a voltage generated by said armature winding, and adjustable means included in said connecting means for simultaneously changing the magnitude and the time phase of the armature voltage impressed on each exciting winding.

5. A self-exciting polyphase commutator type generator comprising a rotatable commutated armature winding having a plurality of circumferentially spaced apart brushes bearing on its commutator, a plurality of stationary exciting windings with their magnetic axes displaced from each other, and switching means having two operating positions for connecting said brushes to said exciting windings so as to impress on each exciting winding either of two time phase displaced voltages generated by said armature winding, one of said switch operating positions connecting each exciting winding so that its resultant magnetic axis is displaced to one side of its zero frequency magnetic axis, and the other of said switch operating positions connecting each exciting winding so that its resultant magnetic axis is displaced to the opposite side of its zero frequency magnetic axis.

6. A self-exciting polyphase commutator type generator comprising a rotatable commutated armature winding having a plurality of circumferentially spaced apart brushes bearing on its commutator, a plurality of stationary exciting windings with their magnetic axes displaced from each other, and switching means having two operating positions for connecting said brushes to said exciting windings so as to impress on each exciting winding either of two time phase displaced voltages generated by said armature winding, one of said switch operating positions connecting each exciting winding so that its resultant magnetic axis is displaced a predetermined angular amount to one side of its zero frequency magnetic axis, and the other of said switch operating positions connecting each exciting winding so that its resultant magnetic axis is displaced substantially said predetermined angular amount to the opposite side of its zero frequency magnetic axis.

7. A three-phase self-exciting commutator type generator comprising a rotatable commutated armature winding having a three-phase arrangement of circumferentially spaced apart brushes bearing on its commutator, a plurality of stationary exciting windings whose magnetic axes are spaced substantially 120 electrical degrees apart, three impedances, means for connecting said impedances in mesh, connecting means between said brushes and said impedances for effecting the energization of the latter by said armature winding, means for connecting together one end of each of three exciting windings whose magnetic axes are spaced substantially 120 electrical degrees apart, and means for respectively connecting the three remaining ends of said three exciting windings to said three impedances, the last mentioned connections to said impedances being adjustable so that each exciting winding end may be connected to any desired point on its corresponding impedance.

8. A three-phase self-exciting commutator type generator comprising a rotatable commutated armature winding having a three-phase arrangement of circumferentially spaced apart brushes bearing on its commutator, a plurality of stationary exciting windings whose magnetic axes are spaced substantially 120 electrical degrees apart, three resistances, means for connecting said resistances in mesh across said commutator brushes, a switch included in the connecting means between each resistance and the commutator brush to which it is connected, means for connecting together one end of each of three exciting windings whose magnetic axes are spaced substantially 120 electrical degrees apart, and means for respectively connecting the three remaining ends of said three exciting windings to said three resistances.

9. A self-exciting polyphase commutator type generator comprising a rotatable commutated armature winding having a plurality of circumferentially spaced apart brushes bearing on its commutator, a plurality of groups of pole pieces, each group consisting of at least one relatively small pole piece which is proportioned to become readily saturated and one adjacent relatively large pole piece which is proportioned not to become readily saturated, exciting windings surrounding said pole pieces, connecting means between said brushes and said exciting windings for impressing a voltage generated by said armature winding on each exciting winding, and means included in said connecting means for changing the time phase of the armature voltage impressed on each exciting winding surrounding a relatively large pole piece.

10. A self-exciting polyphase commutator type generator comprising a rotatable commutated armature winding having a plurality of circumferentially spaced apart brushes bearing on its commutator, a plurality of groups of pole pieces, each group consisting of at least one relatively small pole piece which is proportioned to become readily saturated and one adjacent relatively large pole piece which is proportioned not to become readily saturated, exciting windings surrounding said pole pieces, and connecting means between said brushes and said exciting windings for impressing a voltage generated by said armature winding on each exciting winding surrounding a relatively small pole piece and for selectively impressing either of two time phase displaced voltages generated by said armature winding on each exciting winding surrounding a relatively large pole piece.

11. A three-phase self-exciting commutator type generator comprising a rotatable commutated armature winding having a plurality of circumferentially spaced apart brushes bearing on its commutator, said brushes being spaced substantially 120 electrical degrees apart, 3 N groups of pole pieces, N being any integral number, each group consisting of a relatively small pole piece which is proportioned to become readily saturated and an adjacent relatively large pole piece which is proportioned not to become readily saturated, exciting windings surrounding said pole pieces, three resistances, means for connecting said resistances in mesh to three commutator brushes which are spaced substantially 120 electrical degrees apart, means for connecting the exciting windings which surround the pole pieces of three consecutive groups of pole pieces into two star connected groups of exciting windings, one of said groups of exciting windings surrounding the relatively small pole pieces, and the other of said groups of exciting windings surrounding the relatively large pole pieces, means for connecting to said three commutator brushes the group of exciting windings which surround the relatively small pole pieces, and means for connecting to said resistances the group of exciting windings which surround the relatively large pole pieces.

12. A self-exciting polyphase commutator type generator comprising a rotatable commutated armature winding having a plurality of circumferentially spaced apart brushes bearing on its commutator, a plurality of groups of pole pieces, each group consisting of at least one relatively small pole piece which is proportioned to become readily saturated and one adjacent relatively large pole piece which is proportioned not to become readily saturated, exciting windings surrounding said pole pieces, and connecting means between said brushes and the two exciting windings that surround the two adjacent pole pieces of each group for selectively impressing on one of these two exciting windings either of two time phase displaced voltages generated by said armature winding and for impressing on the other of said two exciting windings an armature winding voltage whose time phase is displaced from the time phase of the voltage impressed on said one of these two exciting windings.

13. A self-exciting polyphase commutator type generator comprising a rotatable commutated armature winding having a plurality of circumferentially spaced apart brushes bearing on its commutator, a plurality of groups of pole pieces, each group consisting of at least one relatively small pole piece which is proportioned to become readily saturated, and one adjacent relatively large pole piece which is proportioned not to become readily saturated, exciting windings surrounding said pole pieces, connecting means between said brushes and said exciting windings for impressing a voltage generated by said armature winding on each exciting winding, and means included in said connecting means for simultaneously changing the time phase and magnitude of the armature voltage impressed on at least one exciting winding surrounding a relatively large pole piece in each group of pole pieces.

14. A self-exciting polyphase commutator type generator comprising a rotatable commutated armature winding having a plurality of circumferentially spaced apart brushes bearing on its commutator, a plurality of groups of exciting windings, each group consisting of at least two exciting windings having the same virtual magnetic axis, and connecting means between said brushes and each group of exciting windings for impressing on the latter voltages generated by said armature winding, whose time phases are so related to the constants of the exciting windings that the currents flowing in the individual exciting windings of each group are displaced from each other less than 90 electrical time degrees, thereby obtaining from each group of exciting windings a resultant magnitude of exciting ampere turns which is greater than the magnitude of the exciting ampere turns produced by any one exciting winding in the group.

15. A self-exciting polyphase commutator type generator comprising a rotatable commutated armature winding having a plurality of circumferentially spaced apart brushes bearing on its commutator, a plurality of groups of pole pieces, each group consisting of at least one relatively small pole piece which is proportioned to become readily saturated, and one adjacent relatively large pole piece which is proportioned not to become readily saturated, exciting windings surrounding said pole pieces, and connecting means between said brushes and the two exciting windings that surround the two adjacent pole pieces of each group for impressing on these two exciting windings two voltages generated by said armature winding whose time phases are so related to the constants of these exciting windings that the currents flowing therein are displaced from each other less than 90 electrical time degrees, thereby obtaining from each group of exciting windings a resultant magnitude of exciting ampere turns which is greater than the magnitude of the exciting ampere turns produced by either exciting winding in the group.

16. A self-exciting polyphase commutator type generator comprising a rotatable commutated armature winding having a plurality of circumferentially spaced apart brushes bearing on its commutator, a plurality of groups of pole pieces, each group consisting of at least one relatively small pole piece which is proportioned to become readily saturated and one adjacent relatively large pole piece which is proportioned not to become readily saturated, exciting windings surrounding said pole pieces, connecting means between said brushes and the two exciting windings that surround the two adjacent pole pieces of each group for respectively impressing on these two exciting windings two time phase displaced voltages generated by said armature winding, and a single regulating device for simultaneously increasing the magnitude of the armature voltage impressed on one of these two exciting windings and decreasing the magnitude of the armature voltage impressed on the other of these two exciting windings, and vice versa.

17. A self-exciting polyphase commutator type generator comprising a rotatable commutated armature winding having a plurality of circumferentially spaced apart brushes bearing on its commutator, a plurality of groups of pole pieces, each group consisting of at least one relatively small pole piece which is proportioned to become readily saturated and one adjacent relatively large pole piece which is proportioned not to become readily saturated, exciting windings surrounding said pole pieces, connecting means between said brushes and the two exciting windings that surround the two adjacent pole pieces of each group for respectively impressing on these two exciting windings two time phase displaced voltages generated by said armature winding, said connecting means being adapted to effect the energization of those exciting windings which surround the relatively large pole pieces by currents whose magnitudes are substantially directly proportional to the magnitudes of the currents which energize those exciting windings which surround the relatively small pole pieces, and a single regulating device for changing the ratio between the magnitudes of the first and second mentioned currents.

18. A three-phase self-exciting commutator type generator comprising a rotatable commutated armature winding having a three-phase arrangement of brushes bearing on its commutator, 3 N groups of pole pieces, N being any integral number, each group consisting of a relatively small pole piece which is proportioned to become readily saturated and an adjacent relatively large pole piece which is proportioned not to become readily saturated, exciting windings surrounding said pole pieces, means for connecting the exciting windings which surround the pole pieces of three consecutive groups of pole pieces into two star connected groups of exciting windings, one of said groups of exciting windings surrounding the relatively small pole pieces and the other of said groups of exciting windings surrounding the relatively large pole pieces, three resistances, means for connecting said two groups of exciting windings in series with each other and in series with said resistances, and means for adjustably connecting said brushes to any desired points on said resistances.

19. A three-phase self-exciting commutator type generator comprising a rotatable commutated armature winding having a three-phase arrangement of brushes bearing on its commutator, 3 N groups of pole pieces, N being any integral number, each group consisting of a relatively small pole piece which is proportioned to become readily saturated and an adjacent relatively large pole piece which is proportioned not to become readily saturated, exciting windings surrounding said pole pieces, means for connecting in star the exciting windings which surround the pole pieces of three consecutive groups of pole pieces, each leg of said star connected windings consisting of an exciting winding surrounding a relatively small pole piece in one group of pole pieces connected in series with an exciting winding surrounding a relatively large pole piece in another group of pole pieces, means for connecting said star connected windings to said commutator brushes, and an adjustable resistance connected across each exciting winding surrounding a relatively large pole piece.

20. The method of varying the frequency of the voltages generated by a polyphase self-exciting commutator type generator having a commutated armature winding and exciting windings energized by the armature winding, which includes changing the time phases of the armature winding voltages impressed on the exciting windings.

21. The method of simultaneously varying the magnitude and frequency of the voltages generated by a polyphase self-exciting commutator type generator having a commutated armature winding and exciting windings energized by the armature winding, the said method including the step of changing the time phases of the armature winding voltages impressed on the exciting windings and simultaneously changing the effective resistances of the circuits of the exciting windings.

22. The method of energizing a plurality of groups of exciting windings of a polyphase self-exciting commutator type generator having a commutated armature winding, each group being energized by the armature winding and consisting of at least two exciting windings having the same virtual magnetic axis, the said method including the step of impressing on each group of exciting windings voltages whose time phases are so related to the constants of the exciting windings that the currents flowing in the individual exciting windings of a group are displaced from each other less than 90 electrical time degrees.

JOHN I. HULL.